United States Patent
Wang

(10) Patent No.: US 10,339,660 B2
(45) Date of Patent: Jul. 2, 2019

(54) VIDEO FINGERPRINT SYSTEM AND METHOD THEREOF

(71) Applicant: Xiaoyi Technology Co., Ltd., Shanghai (CN)

(72) Inventor: Kongqiao Wang, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 343 days.

(21) Appl. No.: 15/200,611

(22) Filed: Jul. 1, 2016

(65) Prior Publication Data

US 2017/0337696 A1 Nov. 23, 2017

(30) Foreign Application Priority Data

May 19, 2016 (CN) .......................... 2016 1 0338357

(51) Int. Cl.
*G06T 7/20* (2017.01)
*H04N 7/18* (2006.01)

(52) U.S. Cl.
CPC ............... *G06T 7/20* (2013.01); *H04N 7/18* (2013.01)

(58) Field of Classification Search
CPC .............................. G06T 11/20; G06T 11/206
USPC ................................................. 348/160–162
See application file for complete search history.

(56) References Cited

U.S. PATENT DOCUMENTS 9,619,908 B1 * 4/2017 Zuczek ................ G06K 9/6219
2004/0052505 A1 3/2004 Ahmad et al.

FOREIGN PATENT DOCUMENTS

| CN | 102906818 A | 1/2013 |
|---|---|---|
| CN | 103262096 A | 8/2013 |
| CN | 104504397 A | 4/2015 |
| CN | 104978554 A | 10/2015 |

OTHER PUBLICATIONS

First Office Action mailed by the State Intellectual Property Office of the People's Republic of China dated Jan. 16, 2017 in Chinese patent application No. 201610338357.X.

* cited by examiner

*Primary Examiner* — Anand S Rao
(74) *Attorney, Agent, or Firm* — Finnegan, Henderson, Farabow, Garrett & Dunner, LLP

(57) ABSTRACT

A system used for generating a transformed representation of a quantity of video data structured as a plurality of frames including arrays of rows and columns of pixels having pixel properties. The system may generate first representations of the video data based on a plurality of the rows; generate second representations of the video data based on a plurality of the columns; generate frame representations corresponding to the frames and based on the first and second representations; and combine the frame representations to form the transformed representation of the video data. The system may also generate frame representations respectively corresponding to the frames; combine the frame representations to form a transformed representation of the video data; analyze the transformed representation; and identify frames of interest based on the analysis.

17 Claims, 8 Drawing Sheets

301 303
302 304

300

310    312

VIDEO FINGERPRINT SYSTEM AND METHOD THEREOF

CROSS-REFERENCE TO RELATED APPLICATION

This application is based upon and claims priority from Chinese Patent Application No. 201610338357.X, filed on May 19, 2016, the disclosure of which is expressly incorporated herein by reference in its entirety.

TECHNICAL FIELD

The present disclosure generally relates to the field of video data analysis and, more specifically, to generating representations of frames in a quantity of video data and identifying frames of interest based on these representations.

BACKGROUND

Video monitoring devices receive streams of video data, or "feeds," from video cameras to monitor premises for various purposes, including, e.g., security monitoring, infant or elderly monitoring, videoconferencing, etc. A video feed may be constantly or periodically monitored by security personnel, and/or recorded for later review. However, content of the video feed may be redundant, especially in security monitoring or video surveillance, where the background remains unchanged. In addition, motion or an activity of interest may occur infrequently or at random and unpredictable times throughout the video. Such characteristics of video feeds may result in undesirably high cost and difficulty of monitoring and surveillance.

Automatic identification of frames of interest in video feed, such as those depicting motion or changes in video background, may decrease monitoring costs and improve the efficiency and sensitivity of monitoring by alerting or otherwise providing notice of significant events. For example, a motion event in the field of a video camera, such as a person entering a secure area, can trigger the monitoring system to begin transmission of a video feed from the camera, to begin recording the video feed, and/or otherwise alert security personnel of the potential intrusion. In another application, movement of a baby being monitored, or entry of a person into the baby's room can trigger the monitoring system to begin transmission of a video feed, begin recording the video feed, and/or alert the parents. The identification of motion or a change in the field of the video camera can also trigger a monitoring system, that is otherwise idle, to transition to an activated status so as to provide an alert or to begin recording.

In another application, automatic identification of frames of interest in recorded video data and generation of a summary representation may allow for improved analysis or editing of the recording. Rather than attempting to manually view the entire recording from start to finish, a summary representation of the recording may permit automatic identification of frames of interest in the recording, and allow a user to directly extract those frames, without the need to view the entire recording. Furthermore, analysis of the summary representation may permit a user to quickly jump to key segments of the recording. Automatic identification of frames of interest in video data may also be applied to virtual reality productions to create better videos, or permit interactive video editing.

Recently, small-sized, lightweight, portable smart video recorders have been developed to incorporate video summary and key frame extraction methods in various types of video analysis. These methods, however, require high computation capacity and complex algorithms. There remains a need for methods and apparatus for summarizing video data and identifying key frames in the data that can be readily implemented in portable video equipment to address the challenges discussed above.

SUMMARY

Consistent with embodiments of this disclosure, there is provided a method for generating a transformed representation of a quantity of video data structured as a plurality of frames including arrays of rows and columns of pixels having pixel properties. The method may include generating first representations of the video data based on a plurality of the rows; generating second representations of the video data based on a plurality of the columns; generating frame representations corresponding to the frames and based on the first and second representations; and combining the frame representations to form the transformed representation of the video data. The method may further include generating the first representations that comprises determining first pluralities of statistical values based on pixel property values of pixels in the rows; and generating the second representations that comprises determining second pluralities of statistical values based on pixel property values of pixels in the columns. Additionally, the method may further include generating the frame representations that comprises combining the first and second pluralities of statistical values.

Consistent with embodiments of this disclosure, there is provided a method for analyzing a quantity of video data structured as a plurality of frames. The method may include generating frame representations respectively corresponding to the frames; combining the frame representations to form a transformed representation of the video data; analyzing the transformed representation; and identifying frames of interest based on the analysis.

Consistent with embodiments of this disclosure, there is further provided a device or system for generating a transformed representation of a quantity of video data structured as a plurality of frames including arrays of rows and columns of pixels having pixel properties. The device or system includes a processor and a memory storing programming for execution by the processor. The processor may be configured to execute the instructions stored in the memory to generate first representations of the video data based on a plurality of the rows; generate second representations of the video data based on a plurality of the columns; generate frame representations corresponding to the frames and based on the first and second representations; and combine the frame representations to form the transformed representation of the video data. The processor may be further configured to execute the instructions to generate the first representations that comprises determining first pluralities of statistical values based on pixel property values of pixels in the rows; and generate the second representations that comprises determining second pluralities of statistical values based on pixel property values of pixels in the columns. Additionally, the processor may be further configured to execute the instructions to generate the frame representations that comprises combining the first and second pluralities of statistical values.

Consistent with embodiments of this disclosure, there is further provided a device or system for analyzing a quantity of video data structured as a plurality of frames. The device or system includes a processor and a memory storing programming for execution by the processor. The processor may be configured to execute the instructions stored in the memory to generate frame representations respectively corresponding to the frames; combine the frame representations to form a transformed representation of the video data; analyze the transformed representation; and identify frames of interest based on the analysis.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

DESCRIPTION OF DRAWINGS

The methods, systems, and/or programming described herein are further described in terms of exemplary embodiments. These non-limiting exemplary embodiments are described in detail with reference to the drawings, wherein.

DETAILED DESCRIPTION

Figure 1:
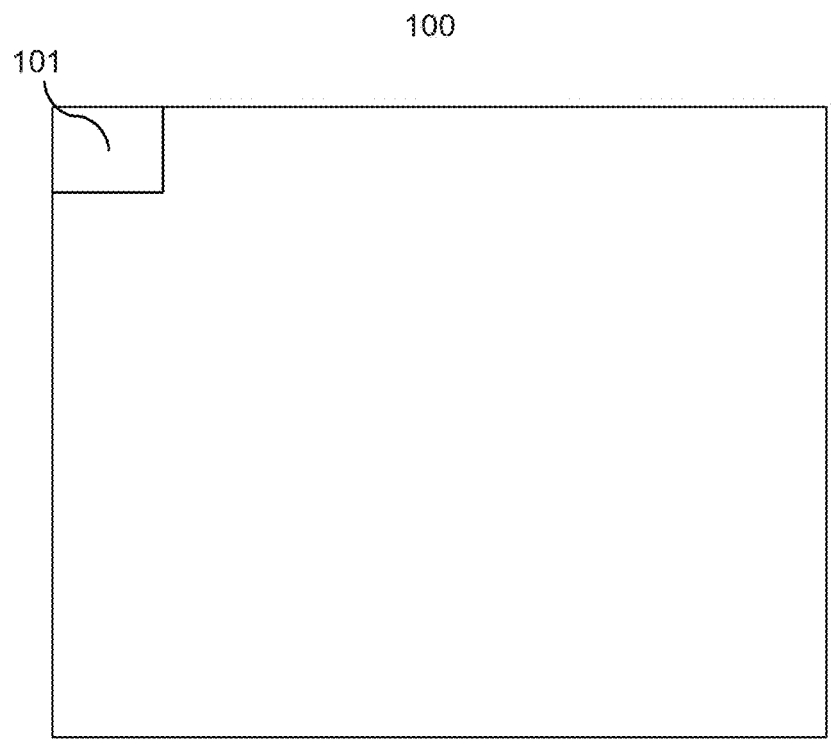
FIG. 1 is an exemplary illustration for analyzing a portion of a frame of video data, according to some embodiments.

Reference will now be made in detail to the disclosed embodiments, examples of which are illustrated in the accompanying drawings. Wherever convenient, the same reference numbers will be used throughout the drawings to refer to the same or like parts.

The objects, features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended as a definition of the limits of the invention. As used in the specification and in the claims, the singular form of "a," "an," and "the" include plural referents unless the context clearly dictates otherwise.

Embodiments of the present disclosure provide methods, systems, and articles of manufacture, such as non-transitory computer-readable media, for analyzing a quantity of video data based on frame representations and a transformed representation. Frame representations may include representations from select pixels, e.g. rows or columns of pixels, in the frame. Combining frame representations generates the transformed representation. The embodiments further provide methods, systems, and articles of manufacture, such as non-transitory computer-readable media, for identifying frames of interest in a quantity of video data based on the transformed representation.

FIG. 1 is an exemplary illustration for analyzing a portion of a frame of video data. FIG. 1 shows a frame 100 having a plurality of pixels (not shown) arranged in rows and columns. For example, frame 100 may have 1080 rows and 1280 columns. Frame 100 includes a frame portion 101, illustrated in greater detail in FIG. 2A, as an example for generating first and second representations of a frame of video data from pixels in frame 100.

Figure 2A:
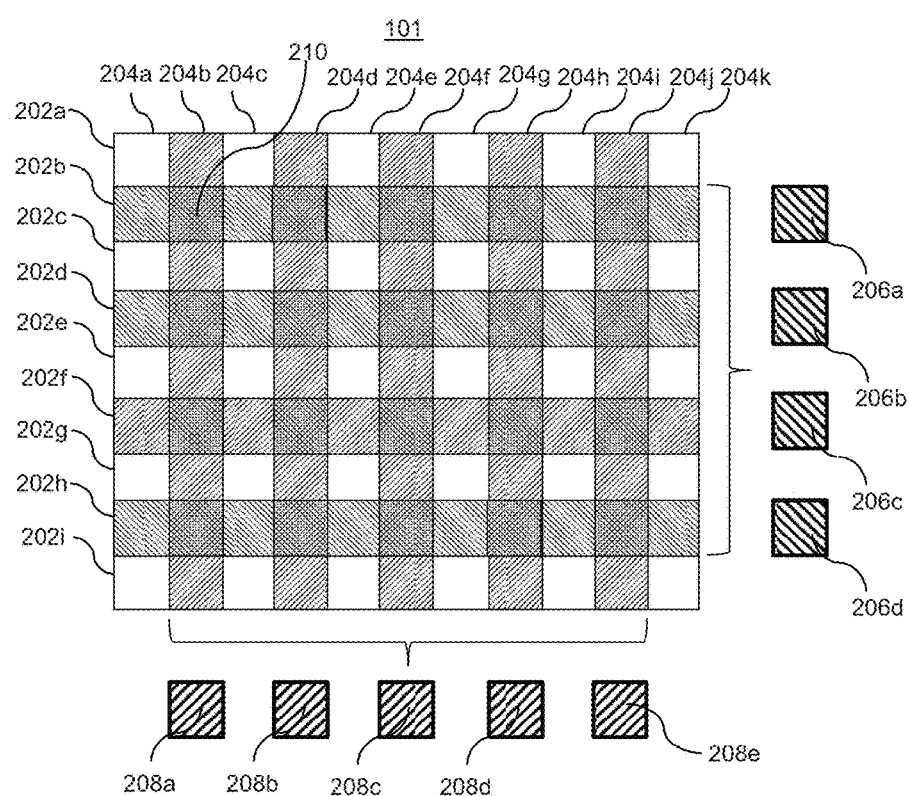
FIG. 2A, is an exemplary illustration for generating first and second representations of a frame of video data from pixels in the frame, according to some embodiments.

FIG. 2A illustrates an example of generating first and second representations of a frame of video data from pixels in the frame. The use of "first" and "second" as designations for the frame representations does not limit the order in which these representations may be generated. The first representation may be generated from rows of pixels in the frame, and the second representation may be generated from columns of pixels in the frame, vice versa.

In FIG. 2A, frame portion 101 is shown in greater detail. Portion 101 includes nine rows of pixels 202a-202i and 11 columns of pixels 204a-204k.

Each pixel can be characterized by one or more properties, for example, color, grayscale, and brightness. For each column and row, one or more statistical values of these properties may be generated. For example, a statistical value for a row of pixels may be obtained based on pixel grayscale values. Additionally or alternatively, multiple statistical values for the same row may be obtained based on multiple properties. Statistical values may include, for example, sums, averages, weighted averages, etc, and may be computed based on, but not limited to, the following equation:

$$p = \frac{\sum_{i=1}^{n} W_i P_i}{\sum_{i=1}^{n} W_i} \quad \text{Eq. 1}$$

In some embodiments, statistical values may be obtained for selected subsets of rows and columns, such as odd-numbered rows or columns, even-numbered rows or columns, every third multiple of rows or columns, etc. In the example illustrated in FIG. 2A, even rows of pixels 202b, 202d, 202f, 202h are selected, along with even columns of pixels 204b, 204d, 204f, 204h, 204j.

A first representation 206 of frame portion 101 is then generated. Specifically, statistical values 206a-206d for the selected rows are generated by applying Equation 1 to the grayscale values of pixels in the respective rows.

A second representation 208 of frame portion 101 is then generated. Specifically, statistical values 208a-208e for the selected columns are generated by applying Equation 1 to the grayscale values of pixels in the respective columns.

Figure 2B:
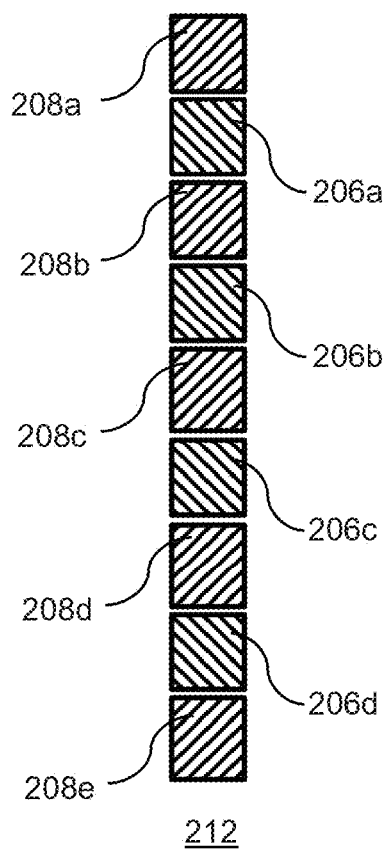
FIG. 2B is an exemplary illustration for generating a frame representation using the first and second representations of FIG. 2A, according to some embodiments.

FIG. 2B illustrates an example how first and second representations 206 and 208 may be used to form a frame representation 212 of frame portion 101. Specifically, frame representation 212 is generated by forming a column of alternating grayscale values of rows and columns. Other arrangements of the first and second representations to generate the frame representation may be adopted. Additionally or alternatively, multiple frame representations of the same frame may be generated based on multiple statistical values for rows and columns according to multiple pixel properties.

In some embodiments, statistical values may be obtained by selecting a subset of intersections, such as 210, to generate a frame representation.

FIGS. 2A and 2B illustrate how to obtain first and second representations, and then generate a frame representation, of a frame portion 101. Additionally and alternatively, frame representation 212 may be generated for the entire frame 100 by applying the above-described steps to all rows and columns, or subsets of rows and columns, of the entire frame. Frame representation 212 for the entire frame may then be used to form a first column of a transformed representation of a quantity of video data as illustrated in FIG. 3A.

Figure 3A:
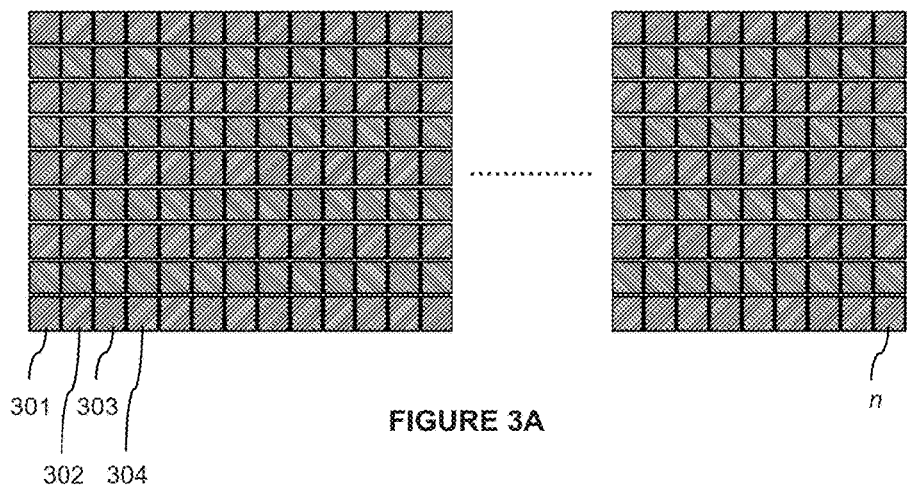
FIG. 3A is an exemplary illustration for combining the frame representations to form a transformed representation of a quantity of video data, according to some embodiments.
Figure 3B:
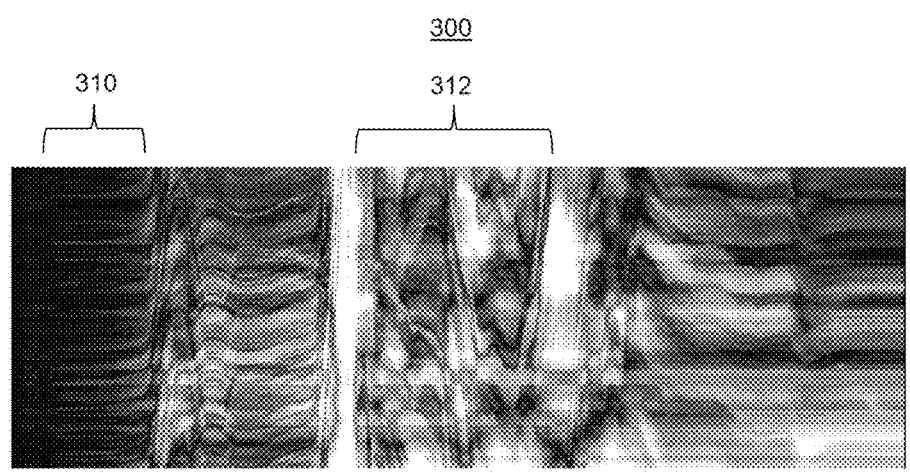
FIG. 3B is an exemplary transformed representation of a quantity of video data, according to some embodiments.

Referring now to FIGS. 3A and 3B, in some embodiments, the process of generating frame representation 212 may be applied to a plurality of frames in some or all of a quantity of video data, such as a video segment or video file to generate a "video fingerprint," that is, a transformed representation of a quantity of video data comprising a composite image of frame representations lined up sequentially from the first frame to the last frame.

In FIG. 3A, in some embodiments, the process of generating frame representation 212 based on grayscale values described above with respect to FIGS. 2A and 2B may be applied to a plurality of frames in some or all of a quantity of video data, such as a video segment or video file, to generate video fingerprint 300, which is a composite image of columns of frame representations 301, 302, 303, 304 . . . n, lined up sequentially, left to right, corresponding to frames in the quantity of video data. Specifically, columns of frame representations begin at 301, 302, 303, 304, and end at n. FIG. 3A thus shows a portion of a composite image data generated from the representations of a plurality of frames in a quantity of video data corresponding to these frames.

An image generated from the composite image data of complete frames is shown in FIG. 3B as an exemplary video fingerprint 300. Each column of pixels of video fingerprint 300 corresponds to a numbered frame. In some embodiments, video fingerprint 300 may include a plurality of frames in one or more segments of video data, or consecutive or non-consecutive frames selected at random or in predictable intervals.

Frame representations 301, 302, 303, 304, . . . n of the portions in FIG. 3A each have nine pixels in a column, similar to frame representation 212 explained above. In some embodiments, the nine pixels exhibit various shades of gray represented by grayscale values. Alternatively, the pixels of video fingerprint 300 may be represented by statistical values of other pixel properties.

Referring to FIG. 3B, streaks, grayscale variations, and other detectable patterns in video fingerprint 300 may provide information concerning activities, moving events, or changes in the quantity of video data. For example, smooth horizontal streaks, e.g., segment 310, may denote fewer or slower activities, moving events, or changes in the video data. In contrast, wave-form streaks, e.g., segment 312, may denote more or faster activities, moving events, or changes in the video data.

Figure 4:
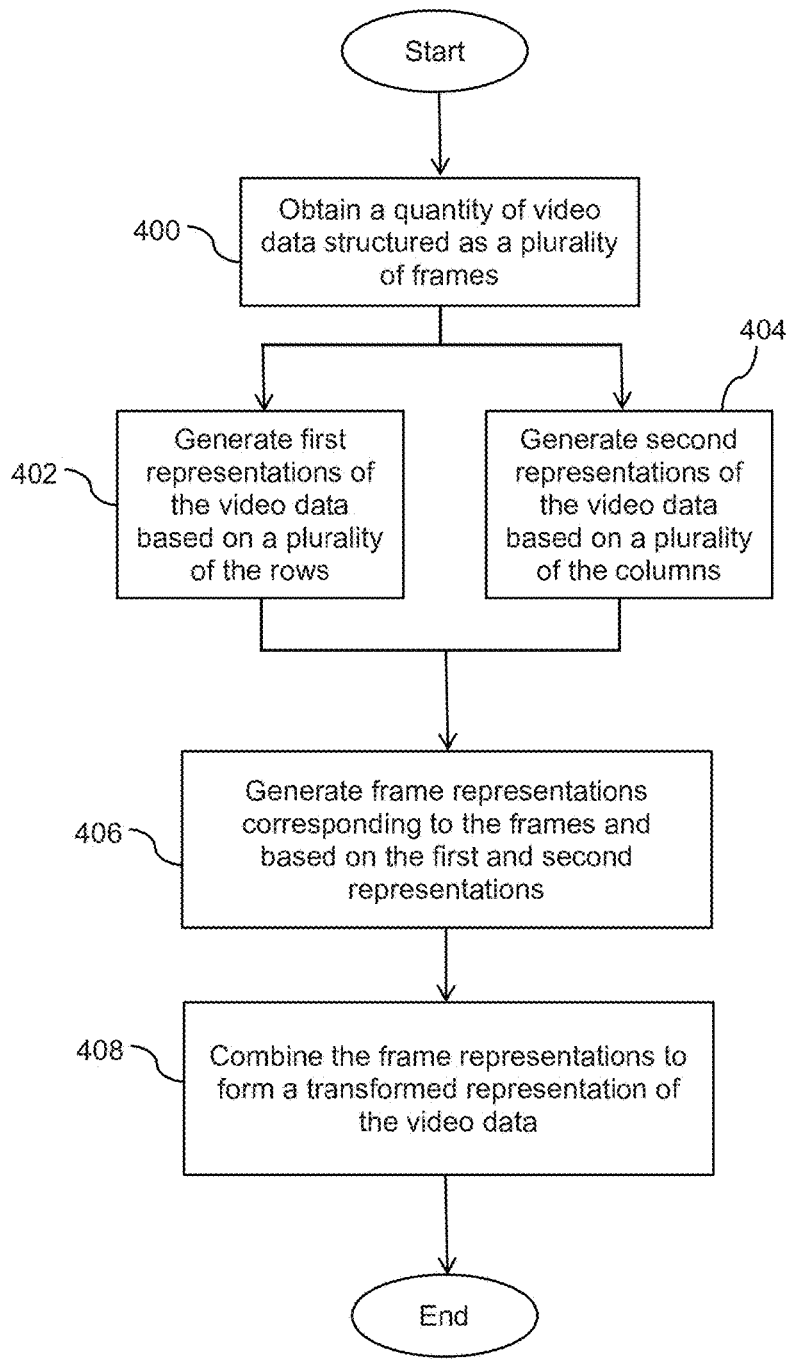
FIG. 4 is a flowchart of an exemplary process for generating frame representations and a transformed representation of a quantity of video data, according to some embodiments.

FIG. 4 is a flowchart of an exemplary process for generating frame representations and a transformed representation of a quantity of video data, such as shown in FIGS. 2A, 2B, 3A, and 3B. The quantity of video data may be captured by a camera or image sensor in real time, or it may extracted from a video data file stored in memory. The quantity of video data includes a plurality of frames, each frame having multiple rows and columns of pixels. At 400, some or all of the frames may be subject to the process in FIG. 4 described below.

In some embodiments, the process for generating frame representations may be applied to every frame of the entire video data or a segment of video data. Alternatively, multiple segments of the video may be selected for processing, at random or in predictable intervals. As another example, consecutive or non-consecutive frames may be processed.

In some embodiments, the frames may be saved in memory for future use. In some embodiments, the frame may be upscaled or downscaled. Additionally or alternatively, certain pixel properties (e.g., color, gray level, or brightness) may be removed, enhanced, or isolated from the frame to reduce computing requirement.

At 402, first representations of the quantity of video data may be generated based on a plurality of the rows of pixels, according to the above-described steps in FIG. 2A. For example, statistical values for the rows may be generated by applying Equation 1 to the grayscale values of pixels in the respective rows. In various embodiments, the first representations may include selecting all rows in the frames or selecting a subset of the rows, for example, consecutive rows, even or odd rows, every third multiple of rows, etc.

In a similar manner, at 404, second representations of the quantity of video may be generated based on a plurality of columns of pixels.

At 406, as shown in FIG. 2B, frame representations may be generated by forming columns of alternating statistical values of the rows and columns of the quantity of video data obtained at 400. For the frames of the data obtained at 400, corresponding frame representations may be generated based on the statistical values of rows and columns of the frames.

At 408, the frame representations may be arranged sequentially to form a transformed representation of the quantity of video data.

Figure 5:
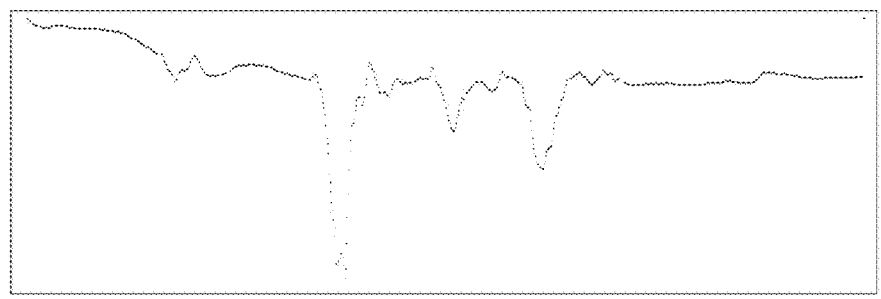
FIG. 5 is another exemplary transformed representation of a quantity of video data, according to some embodiments.

Referring to FIG. 5, in some embodiments, an edge detection method employing a horizontal gradient function may be applied to some or all portions of video fingerprint 300 to yield corresponding vertical edge values. Other edge detection methods, such as Prewitt operator, Sobel operator, Robinson Compass Masks, Krisch Compass Masks, or Laplacian Operator may also be applied. The absolute sum of the vertical edge values at a given x-coordinate may be obtained from the absolute sum of all vertical edge values of the pixels with the same x-coordinate. For example, the absolute sum of vertical edge values of a pixel P(i,j) may be obtained as follows: $|P_{i-3,j}+P_{i-2,j}+P_{i-1,j}-P_{i+1,j}-P_{i+2,j}-P_{i+3,j}|$. The vertical edge values may be computed based on, but not limited to, the following equation:

$$Ev=|P_{i-3,j}+P_{i-2,j}+P_{i-1,j}-P_{i+1,j}-P_{i+2,j}-P_{i+3,j}| \quad \text{Eq. 2}$$

FIG. 5 shows another exemplary video fingerprint comprising a graphical representation 500 corresponding to grayscale image video fingerprint 300 of FIG. 3, the graphical representation being generated by applying the edge detection method described above. The x-coordinate in 500 corresponds to the x-coordinate of video fingerprint 300, and correspondingly, to frames in the quantity of video data; and the y-coordinate corresponds to the vertical edge values of video fingerprint 300.

The linear characteristics of graphical representation 500 may provide information concerning activities, moving events, or changes in the quantity of video data. Points of interest, which are frames with activities, moving events, or changes in the quantity of video data, may include peaks, valleys, or other detectable changes of the graphical representation. For example, a relatively smooth region of graphical representation 500 may denote fewer or slower activities, moving events, or changes in the quantity of video data. In contrast, a wave-form region of graphical representation 500 may denote more or faster activities, moving events, or changes in the quantity of video data.

Figure 6:
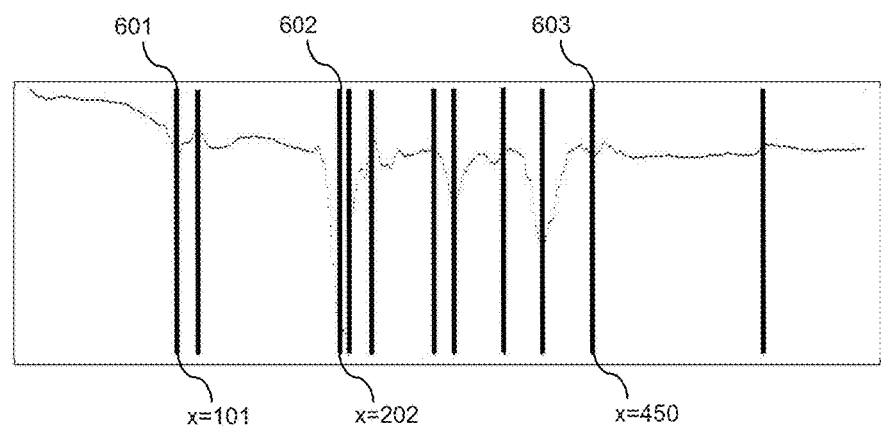
FIG. 6 is an exemplary illustration for identifying frames of interest, according to some embodiments.

FIG. 6 illustrates identifying frames of interest using graphical representation 500. Graphical representation 500 may be expressed as y=f(x). In some embodiments, points of interest may be identified by determining extreme points, such as local maxima and local minima, which may be obtained by calculating points at which the derivative of graphical presentation 500 approaches zero. The x-values of the extreme points may be located where f'(x)=0 according to the process explained in FIG. 7 below. For example, FIG. 6 shows local minima 601, 602, and 603. The x-values of local minima 601, 602, and 603 on graphical representation 500 are obtained (e.g., x=101, 202, 450) and used to identify corresponding frames 101, 202, and 450 of the quantity of video data as frames of interest. These frames of interest may depict significant activities, moving events, or changes may then be automatically provided to a user without requiring the user to review the entire video. Additionally or alternatively, an alert may be generated, which may include display of image and/or video data associated with identified frames. The alert may be transmitted to the user, a third-party (e.g., the police), or a service provider, etc.

Figure 7:
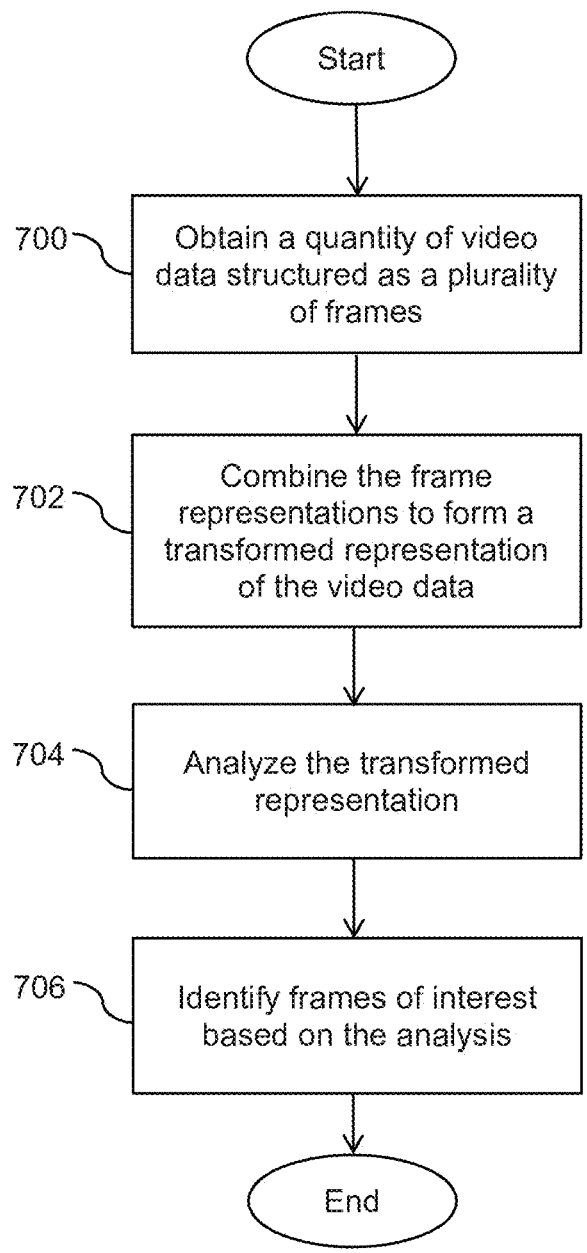
FIG. 7 is a flowchart of an exemplary process for analyzing a transformed representation of a quantity of video data and identifying frames of interest, according to some embodiments.

FIG. 7 is a flowchart of an exemplary process for analyzing a transformed representation of a quantity of video data and identifying frames of interest. At 700 a quantity of video data structured as a plurality of frames is obtained, as shown in FIGS. 1 and 4. At 702, frame representations are generated and used to form a transformed representation of the quantity of video data, for example, as shown in FIGS. 2A, 2B, 3A, 3B, and 4.

At 704, the transformed representation of the quantity of video data may be analyzed to identify points of interest, e.g. frames with activities, moving events, or changes in the quantity of video data. In some embodiments, as illustrated in FIG. 3B and described above, the streaks, color variations, and other detectable patterns in grayscale-image video fingerprint 300 may provide information concerning activities, moving events, or changes in the quantity of video data. In some other embodiments, as illustrated in FIG. 5, the peaks, valleys, or other detectable changes of the graphical representation 500 may provide such information.

Additionally or alternatively, at 704, points of interests may correspond to extreme points, that is, local maxima or minima, on graphical representation 500, Based on the analysis of 704, frames of interest may be identified at 706, based on the x-values of the extreme points, which correspond to certain frames with significant activities, moving events, or changes in the quantity of video data.

Figure 8:
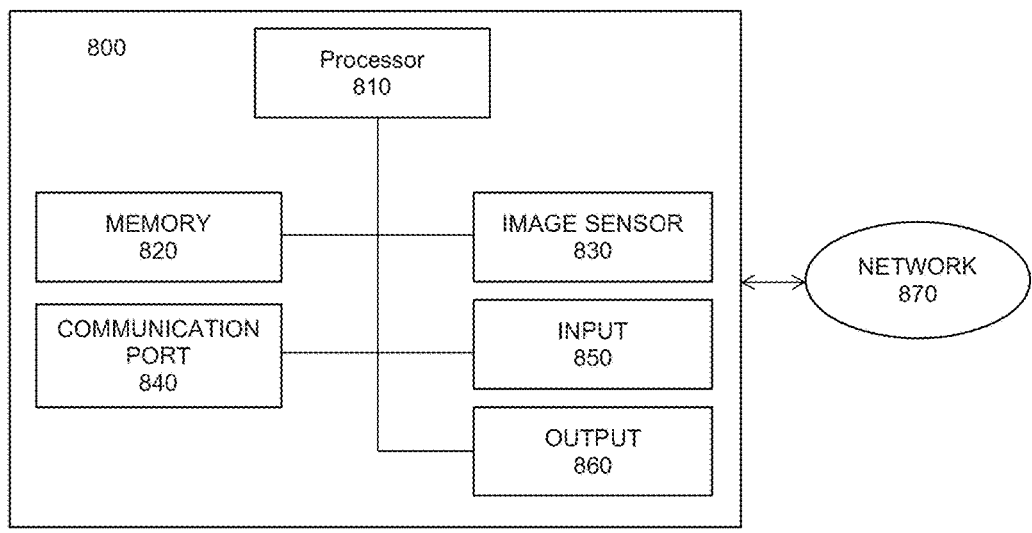
FIG. 8 is a block diagram of an exemplary system for analyzing a quantity of video data, according to some embodiments.

FIG. 8 is a block diagram of an exemplary system 800 for analyzing a quantity of video data. System 800 may include one or more processors 810, memory 820, image sensor 830, communication port 840, input 850, and output 860. In operation, processor 810 may execute computer instructions (program code) and perform functions (e.g., one or more steps in FIGS. 4 and 7) in accordance with methods described herein. For example, processor 810 may receive and analyze the captured video data by image sensor 830 and determine whether the video data shows any activity or moving event. Memory 820 may store executable computer instructions (program code) and captured data such as still frames. Image sensor 830 may include, e.g., one or more CCD sensors or CMOS sensors configured to capture visible and/or invisible (e.g., infrared or ultraviolet) light. Communication port 840 may be a device configured to facilitate communications between system 800 and the user, third parties, or service providers, etc. Input 850 may be a device (e.g., a keyboard, keypad, touchscreen, and/or a mouse or other pointing device) configured to allow the user to enter or input various types of information, and output 860 may be a device (e.g., a screen or display) configured to communicate information to the user.

Processor 810 may include or be part of one or more known processing devices such as, for example, a microprocessor. In some embodiments, processor 810 may include any type of single or multi-core processor, mobile device microcontroller, central processing unit, etc.

Memory 820 may include electronic memories such as random access memory (RAM), read-only memory (ROM), or other types of memory, in any combination. Memory 820 may also be viewed as what is more generally referred to as a "computer program product" having computer instructions (program code) which, when executed by processor 810 perform methods as described above. Examples of computer program products embodying aspects of the invention may include non-transitory computer-readable storage media such as hard drives, optical or magnetic disks, solid state memory, or other computer-readable media.

System 800 may communicate with one or more user devices, third-parties (such as the police or fire station, etc.), or service providers (not shown) through network 870. Network 870 may include, or be part of any one or more of a variety of networks or other types of communication connections known to those skilled in the art. Network 870 may include a network connection, bus, or other type of data link, such as a hardwire or other connection known in the art. For example, network 870 may include or be part of the Internet, an intranet network, a local area network, or other wireless or other hardwired connection or connections (e.g., Bluetooth, WiFi, 4G, LTE cellular data networks, etc.) through which the components of system 800 may communicate.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the disclosure. The examples are to be construed as non-exclusive. Furthermore, the steps of the disclosed routines may be modified in any manner, including by reordering steps and/or inserting or deleting steps. In particular, non-dependent steps may be performed in any order, or in parallel. It is intended, therefore, that the specification and examples be considered as illustrative only, with a true scope and spirit being indicated by the following claims and their full scope of equivalents.

What is claimed is:

1. A method for generating a transformed representation of a quantity of video data structured as a plurality of frames including arrays of rows and columns of pixels having pixel properties, comprising:
generating first representations of the video data based on a plurality of the rows;
wherein generating the first representations includes determining first pluralities of statistical values based on pixel property values of pixels in the rows;
generating second representations of the video data based on a plurality of the columns;
wherein generating the second representations includes determining second pluralities of statistical values based on pixel property values of pixels in the columns;
generating frame representations corresponding to the frames and based on the first and second representations; and
combining the frame representations to form the transformed representation of the video data.

2. The method of claim 1, further comprising:
selecting a subset of the rows;
selecting a subset of the columns; and
generating the first and second representations based on the row subsets and column subsets, respectively.

3. The method of claim 1, wherein generating the frame representations further comprises combining the first and second pluralities of statistical values.

4. The method of claim 1, wherein generating the frame representations further comprises:
converting the first and second pluralities of statistical values into video data representing pixels; and
structuring pixel video data into columns of pixels respectively corresponding to the frames.

5. A method of analyzing a quantity of video data structured as a plurality of frames, comprising:
generating frame representations respectively corresponding to the frames;
combining the frame representations to form a transformed representation of the video data;
analyzing the transformed representation; and
identifying frames of interest based on the analysis;
wherein the identified frames of interest include frames with at least one of an activity, a moving event, or a change in a quantity of video data.

6. The method of claim 5, wherein:
the frame representations are structured as video data representing columns of pixels; and
the transformed representation comprises an image.

7. The method of claim 6, wherein analyzing the transformed representation comprises analyzing statistical values of one or more pixel properties of the image.

8. The method of claim 5, wherein the transformed representation comprises a graph.

9. The method of claim 8, wherein analyzing the transformed representation comprises identifying at least one of local maxima of a graph or local minima of the graph.

10. A system for generating a transformed representation of a quantity of video data structured as a plurality of frames including arrays of rows and columns of pixels having pixel properties, comprising:
a memory storing instructions; and
a processor configured to execute the instructions to:
generate first representations of the video data based on a plurality of the rows;
wherein generating the first representations includes determining first pluralities of statistical values based on pixel property values of pixels in the rows;
generate second representations of the video data based on a plurality of the columns;
wherein generating the second representations includes determining second pluralities of statistical values based on pixel property values of pixels in the columns;
generate frame representations corresponding to the frame and based on the first and second representations; and
combine the frame representations to form the transformed representation of the video data.

11. The system of claim 10, wherein generating the frame representations further comprises:
converting the first and second pluralities of statistical values into video data representing pixels; and
structuring pixel video data into columns of pixels respectively corresponding to the frames.

12. A system of analyzing a quantity of video data structured as a plurality of frames, comprising:
a memory storing instructions; and
a processor configured to execute the instructions to:
generate frame representations respectively corresponding to the frames;
combine the frame representations to form a transformed representation of the video data;
analyze the transformed representation;
identify frames of interest based on the analysis;
wherein the identified frames of interest include frames with at least one of an activity, a moving event, or a change in a quantity of video data.

13. The system of claim 12, wherein:
the frame representations are structured as video data representing columns of pixels; and
the transformed representation comprises an image.

14. A non-transitory computer-readable storage medium storing instructions that, when executed by at least one processor, cause the at least one processor to perform a method for generating a transformed representation of a quantity of video data structured as a plurality of frames including arrays of rows and columns of pixels having pixel properties, the method comprising:
generating first representations of the video data based on a plurality of the rows;
wherein generating the first representations includes determining first pluralities of statistical values based on pixel property values of pixels in the rows;
generating second representations of the video data based on a plurality of the columns;
wherein generating the second representations includes determining second pluralities of statistical values based on pixel property values of pixels in the columns;
generating frame representations corresponding to the frames and based on the first and second representations; and
combining the frame representations to form the transformed representation of the video data.

15. The non-transitory computer-readable storage medium of claim 14, wherein generating the frame representations further comprises:
converting the first and second pluralities of statistical values into video data representing pixels; and
structuring pixel video data into columns of pixels respectively corresponding to the frames.

16. A non-transitory computer-readable storage medium storing instructions that, when executed by at least one processor, cause the at least one processor to perform a method for generating a transformed representation of a quantity of video data structured as a plurality of frames including arrays of rows and columns of pixels having pixel properties, the method comprising:
generating frame representations respectively corresponding to the frames;
combining the frame representations to form a transformed representation of the video data;
analyzing the transformed representation; and
identifying frames of interest based on the analysis;
wherein the identified frames of interest include frames with at least one of an activity, a moving event, or a change in a quantity of video data.

17. The non-transitory computer-readable storage medium of claim 16, wherein:
the frame representations are structured as video data representing columns of pixels; and
the transformed representation comprises an image.

* * * * *